US008328096B2

(12) United States Patent
Daily

(10) Patent No.: US 8,328,096 B2
(45) Date of Patent: *Dec. 11, 2012

(54) SELF CHECKOUT KIOSK AND RETAIL SECURITY SYSTEM

(75) Inventor: Michael A. Daily, Claremont, NC (US)

(73) Assignee: Freedom Shopping, Inc., Statesville, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/488,202

(22) Filed: Jun. 4, 2012

(65) Prior Publication Data

US 2012/0241518 A1 Sep. 27, 2012

Related U.S. Application Data

(63) Continuation of application No. 11/910,436, filed as application No. PCT/US2005/047149 on Dec. 27, 2005, now Pat. No. 8,191,780.

(60) Provisional application No. 60/669,183, filed on Apr. 7, 2005.

(51) Int. Cl.
*G06K 15/00* (2006.01)
*G06K 5/00* (2006.01)
*G06K 7/00* (2006.01)
*G06Q 30/00* (2012.01)

(52) U.S. Cl. ............ 235/383; 235/2; 235/380; 235/385; 235/439; 705/15

(58) Field of Classification Search ........................ None
See application file for complete search history.

(56) References Cited

U.S. PATENT DOCUMENTS

| | | | |
|---|---|---|---|
| 5,238,968 A | 8/1993 | Morita et al. | |
| 5,500,650 A | 3/1996 | Snodgrass et al. | |
| 5,627,544 A | 5/1997 | Snodgrass et al. | |
| 5,745,036 A | 4/1998 | Clare | |
| 5,963,134 A | 10/1999 | Bowers et al. | |
| 5,974,078 A | 10/1999 | Tuttle et al. | |
| 6,025,780 A | 2/2000 | Bowers et al. | |
| 6,101,483 A | 8/2000 | Petrovich et al. | |

(Continued)

FOREIGN PATENT DOCUMENTS

JP 8221661 8/1996

(Continued)

OTHER PUBLICATIONS

Collins; Avery Designs Passive UHF Tag for Metal; RFID Journal, 2 pages; Mar. 9, 2005.

(Continued)

*Primary Examiner* — Fahd Obeid
(74) *Attorney, Agent, or Firm* — Snell & Wilmer, LLP

(57) ABSTRACT

A self-checkout kiosk enables a patron to purchase product displayed in a vending area and carrying a Radio Frequency Identification (RFID) tag. The customer exits the vending area through a security portal. The kiosk, a bill acceptor, and a computer monitor, either adjacent the portal or separated there from, enables the patron to complete a purchase transaction prior to exiting the vending area through the portal. The portal includes RFID reading antennas for detecting product being transferred through the portal. A security system responds to transfer of product through the portal without a patron completing a purchase transaction using the self-checkout station. The security system itself is also usable in conventional retail environments when an attendant is present.

8 Claims, 7 Drawing Sheets

U.S. PATENT DOCUMENTS

| | | | |
|---|---|---|---|
| 6,147,604 | A | 11/2000 | Wiklof et al. |
| 6,169,483 | B1 | 1/2001 | Ghaffari et al. |
| 6,294,998 | B1 | 9/2001 | Adams et al. |
| 6,459,726 | B1 | 10/2002 | Ovard et al. |
| 6,486,783 | B1 | 11/2002 | Hausladen et al. |
| 6,497,362 | B2 | 12/2002 | Persky et al. |
| 6,507,279 | B2 | 1/2003 | Loof |
| 6,547,040 | B2 | 4/2003 | Goodwin, III |
| 6,554,187 | B2 | 4/2003 | Otto |
| 6,557,760 | B2 | 5/2003 | Goodwin, III |
| 6,598,790 | B1 | 7/2003 | Horst |
| 6,598,791 | B2 | 7/2003 | Bellis, Jr. et al. |
| 6,648,232 | B1 | 11/2003 | Emmert |
| 6,651,053 | B1 | 11/2003 | Rothschild |
| 6,825,766 | B2 * | 11/2004 | Hewitt et al. .............. 340/572.7 |
| 6,837,436 | B2 | 1/2005 | Swartz et al. |
| 6,868,073 | B1 | 3/2005 | Carrender |
| 6,883,710 | B2 | 4/2005 | Chung |
| 6,940,408 | B2 | 9/2005 | Ferguson et al. |
| 6,967,563 | B2 | 11/2005 | Bormaster |
| 6,975,229 | B2 | 12/2005 | Carrender |
| 6,994,252 | B2 | 2/2006 | Frich |
| 7,005,988 | B2 | 2/2006 | Mathewson, II et al. |
| 7,040,541 | B2 | 5/2006 | Swartz et al. |
| 7,045,179 | B2 | 5/2006 | Mizutani et al. |
| 7,107,221 | B1 | 9/2006 | Tracy et al. |
| 7,108,183 | B1 | 9/2006 | Cox, Jr. |
| 7,113,088 | B2 | 9/2006 | Frick et al. |
| 7,123,146 | B1 | 10/2006 | Holzman |
| 7,133,843 | B2 | 11/2006 | Hansmann et al. |
| 7,150,395 | B1 | 12/2006 | White |
| 7,156,303 | B1 | 1/2007 | Holzman |
| 7,170,415 | B2 | 1/2007 | Forster |
| 7,183,928 | B2 | 2/2007 | Redlin |
| 7,185,809 | B2 | 3/2007 | Barton et al. |
| 7,187,289 | B2 | 3/2007 | Eckstein et al. |
| 7,221,269 | B2 | 5/2007 | Onderko et al. |
| 7,259,678 | B2 | 8/2007 | Brown et al. |
| 7,315,248 | B2 | 1/2008 | Egbert |
| 7,325,734 | B2 * | 2/2008 | Howarth et al. .............. 235/451 |
| 7,328,170 | B2 | 2/2008 | Jacobs et al. |
| 7,416,117 | B1 * | 8/2008 | Morrison ................. 235/383 |
| 7,463,156 | B2 | 12/2008 | Baba et al. |
| 7,466,232 | B2 | 12/2008 | Neuwirth |
| 7,522,051 | B2 | 4/2009 | Sanari et al. |
| 7,629,063 | B2 | 12/2009 | Yamamoto et al. |
| 7,652,636 | B2 | 1/2010 | Forster et al. |
| RE41,531 | E | 8/2010 | Wood, Jr. |
| 2001/0000019 | A1 | 3/2001 | Bowers et al. |
| 2002/0096564 | A1 | 7/2002 | Bellis, Jr. et al. |
| 2002/0139617 | A1 | 10/2002 | Goodwin, III |
| 2002/0186133 | A1 | 12/2002 | Loof |
| 2003/0122667 | A1 * | 7/2003 | Flynn .............. 340/540 |
| 2003/0135417 | A1 | 7/2003 | Bodin |
| 2003/0174051 | A1 | 9/2003 | Naitou |
| 2004/0018227 | A1 | 1/2004 | Park et al. |
| 2004/0103034 | A1 | 5/2004 | Reade et al. |
| 2004/0143505 | A1 | 7/2004 | Kovach |
| 2004/0220860 | A1 * | 11/2004 | Persky et al. ................. 705/23 |
| 2005/0027611 | A1 | 2/2005 | Wharton |
| 2005/0040934 | A1 | 2/2005 | Shanton |
| 2005/0049914 | A1 | 3/2005 | Parish |
| 2005/0073417 | A1 | 4/2005 | Mathewson et al. |
| 2005/0140512 | A1 | 6/2005 | Sakama et al. |
| 2005/0167493 | A1 | 8/2005 | Barton et al. |
| 2005/0173527 | A1 | 8/2005 | Conzola |
| 2005/0269407 | A1 | 12/2005 | Harmon |
| 2005/0289039 | A1 * | 12/2005 | Greak .............. 705/37 |
| 2006/0016885 | A1 | 1/2006 | Roberts et al. |
| 2006/0022825 | A1 | 2/2006 | Carrender |
| 2006/0054710 | A1 | 3/2006 | Forster et al. |
| 2006/0122934 | A1 | 6/2006 | White et al. |
| 2006/0138220 | A1 | 6/2006 | Persky |
| 2006/0145927 | A1 | 7/2006 | Choi et al. |
| 2006/0175402 | A1 | 8/2006 | Maitin |
| 2006/0231611 | A1 | 10/2006 | Chakiris et al. |
| 2006/0231616 | A1 | 10/2006 | Gibault |
| 2006/0255941 | A1 | 11/2006 | Carrender et al. |
| 2006/0255945 | A1 | 11/2006 | Egbert |
| 2006/0266824 | A1 | 11/2006 | Hassenbuerger |
| 2006/0278704 | A1 | 12/2006 | Saunders et al. |
| 2006/0289637 | A1 | 12/2006 | Brice et al. |
| 2007/0008138 | A1 | 1/2007 | Mosher, Jr. et al. |
| 2007/0034692 | A1 | 2/2007 | Johnson |
| 2007/0061210 | A1 | 3/2007 | Chen et al. |
| 2007/0069011 | A1 | 3/2007 | Barton et al. |
| 2007/0075861 | A1 | 4/2007 | Cook et al. |
| 2007/0102513 | A1 | 5/2007 | Scheb |
| 2007/0114279 | A1 | 5/2007 | Lessing et al. |
| 2007/0124216 | A1 | 5/2007 | Lucas |
| 2007/0126588 | A1 | 6/2007 | Mess |
| 2007/0164868 | A1 | 7/2007 | Deavours et al. |
| 2007/0194993 | A1 | 8/2007 | Deavours et al. |
| 2007/0195003 | A1 | 8/2007 | Deavours et al. |
| 2008/0011836 | A1 | 1/2008 | Adema et al. |
| 2008/0024305 | A1 | 1/2008 | Deavours |
| 2008/0131133 | A1 | 6/2008 | Blunt et al. |

FOREIGN PATENT DOCUMENTS

| | | |
|---|---|---|
| JP | 2001076261 | 3/2001 |
| JP | 2001103453 | 4/2001 |
| JP | 2001325647 | 11/2001 |
| JP | 2005284671 | 10/2005 |
| JP | 2005301637 | 10/2005 |
| JP | 2008221661 | 9/2008 |
| JP | 2008537825 | 9/2008 |

OTHER PUBLICATIONS http://starportech.com/products/metal_mount_tags.html; Apr. 15, 2010.

Swedberg, Clarie; "University of Kansas' Tag for Metal, Liquids"; RFID Journal, 2 pages; Apr. 19, 2006.

"Agility: Foam Based RFID Tags Can Work With Liquids and Metals"; www.rfid-weblog.com; 5 pages; Jul. 24, 2008.

Bacheldor; "University of Kansas Lab Develops Foam-Attached Tag", RFID Journal, 2 pages; Jun. 24, 2008.

Bacheldor; "New RFID Products for Coping with Metal"; RFID Journal, 2 pages; Jun. 29, 2006.

http://www.idplate.com/rfid-tags-labels/rfid-asset-products/metal-mount-rfid-tag/default.html.

"UHF KU RFID Tag"; University of Kansas Information & Telecommunication Technology Center; 2 pages.

"Agility RFID Technology"; http://www.ittc.ku.edu/agility/.

Wille; Evaluation and Optimization of RFID Transition Control Strategies, Mar. 2005, pp. 1-3.

* cited by examiner

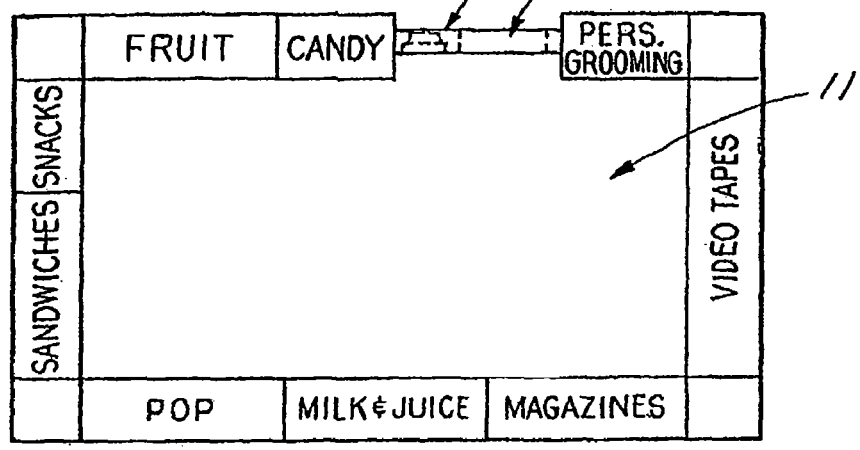
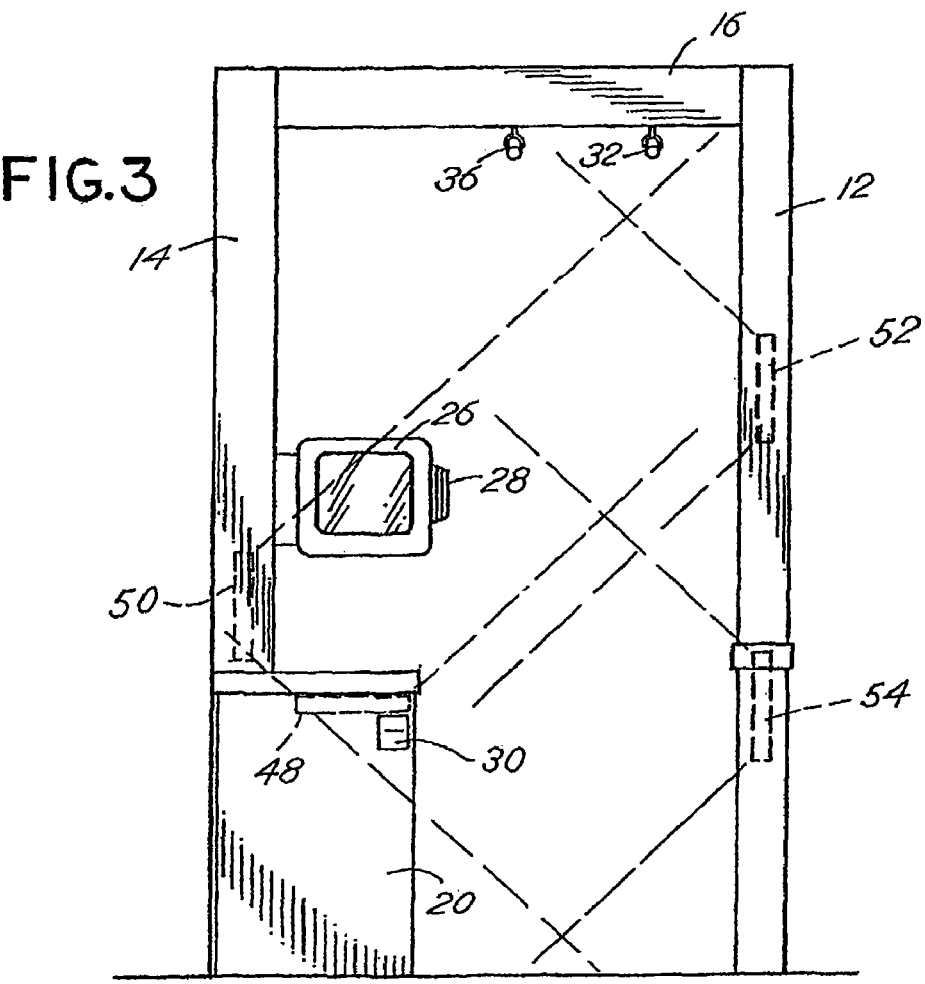

SELF CHECKOUT KIOSK AND RETAIL SECURITY SYSTEM

CROSS REFERENCE TO RELATED APPLICATIONS

This application is a continuation of and claims the benefit and priority of U.S. patent application Ser. No. 11/910,436, filed Jun. 13, 2008, now U.S. Pat. No. 8,191,780, which is a 371 Application of PCT/US2005/047149 filed Dec. 27, 2005, which claims the benefit and priority of U.S. Provisional Application Ser. No. 60/669,183, filed Apr. 7, 2005.

FIELD

This invention relates to a self checkout kiosk that enables a patron to purchase product without the presence of a checkout attendant. The kiosk incorporates a retail security system that can be used separately in conventional retail environments to reduce shrinkage. As used herein, the term "kiosk" means any area in which product is stored and displayed and which includes a self-checkout station permitting a patron to complete a purchase transaction and a portal incorporating a security system, and the term "tag" means both tags that are separately applied to a product as well as tags that are an integral part of the product or are integral with packaging. The self-checkout station may be adjacent to and/or integral with the portal, or may be located within the kiosk separate from the portal.

BACKGROUND OF THE INVENTION

Self checkout point of sale (POS) systems are well known in the art. One example of such a system is found in grocery stores having self checkout lanes. A POS typically includes a terminal, bar code reader, a computer, and POS software. The patron scans products using a bar code reader. The computer communicates with the patron via the POS software when the bar code reader has been successfully used to read the Universal Product Code (UPC) and then transmits the UPC information to a host server, which processes the UPC information by comparing it to a database. The database typically includes information such as number of units in stock, price per unit, and any other information which may facilitate the transaction in addition to the UPC.

Such an automated sales system has obvious limitations including, by way of example, the lack of security measures working in concert with the system. All sales must be monitored by an attendant to insure that the patron has presented each merchandise item to the bar code scanner. The requirement for an attendant to monitor the sales limits the number of sales terminals that may be operated, as it is not cost effective to have an attendant monitoring such a terminal during periods of low sales volumes. Accordingly, there is a need for an automated shopping system with a security system that avoids the need for an attendant to be present to monitor all sales transactions which may take less time to consummate the transaction. Additionally, in conventional retail environments in which one or more attendants are present, enhanced security measures are desirable to reduce product shrinkage.

Recently, inventory control systems using Radio Frequency Identification (RFID) systems have become available for inventory control. Unlike bar code systems, in which the bar code must be directly displayed to the bar code reader, RFID systems use radio waves to read a tag anywhere within the field generated by the reader, regardless of the orientation of a particular tag.

SUMMARY OF THE INVENTION

The present invention relates to a self-checkout kiosk for enabling a patron to purchase product displayed in a vending area and carrying a Radio Frequency Identification (RFID) tag. The customer enters and leaves the vending area through a portal which includes a security system. The kiosk includes a self-checkout station including, for example, a bill acceptor, credit/debit card reader and a computer and computer monitor. The self-checkout station may be either adjacent the portal or separated there from, and enables the patron to complete a purchase transaction prior to exiting the vending area through the portal. The portal includes RFID reading antennas for detecting product being transferred through the portal. A security system responds to transfer of product through the portal without a patron completing a purchase transaction using the self-checkout means. The portal and security system itself is also usable in conventional retail environments when an attendant is present.

BRIEF DESCRIPTION OF THE DRAWINGS

FIG. 2 is a top plan view of a vending area of the kiosk as illustrated in FIG. 1;

FIG. 3 is a side elevation view of the kiosk illustrated in FIG. 1;

DESCRIPTION OF THE PREFERRED EMBODIMENT

Figure 1:
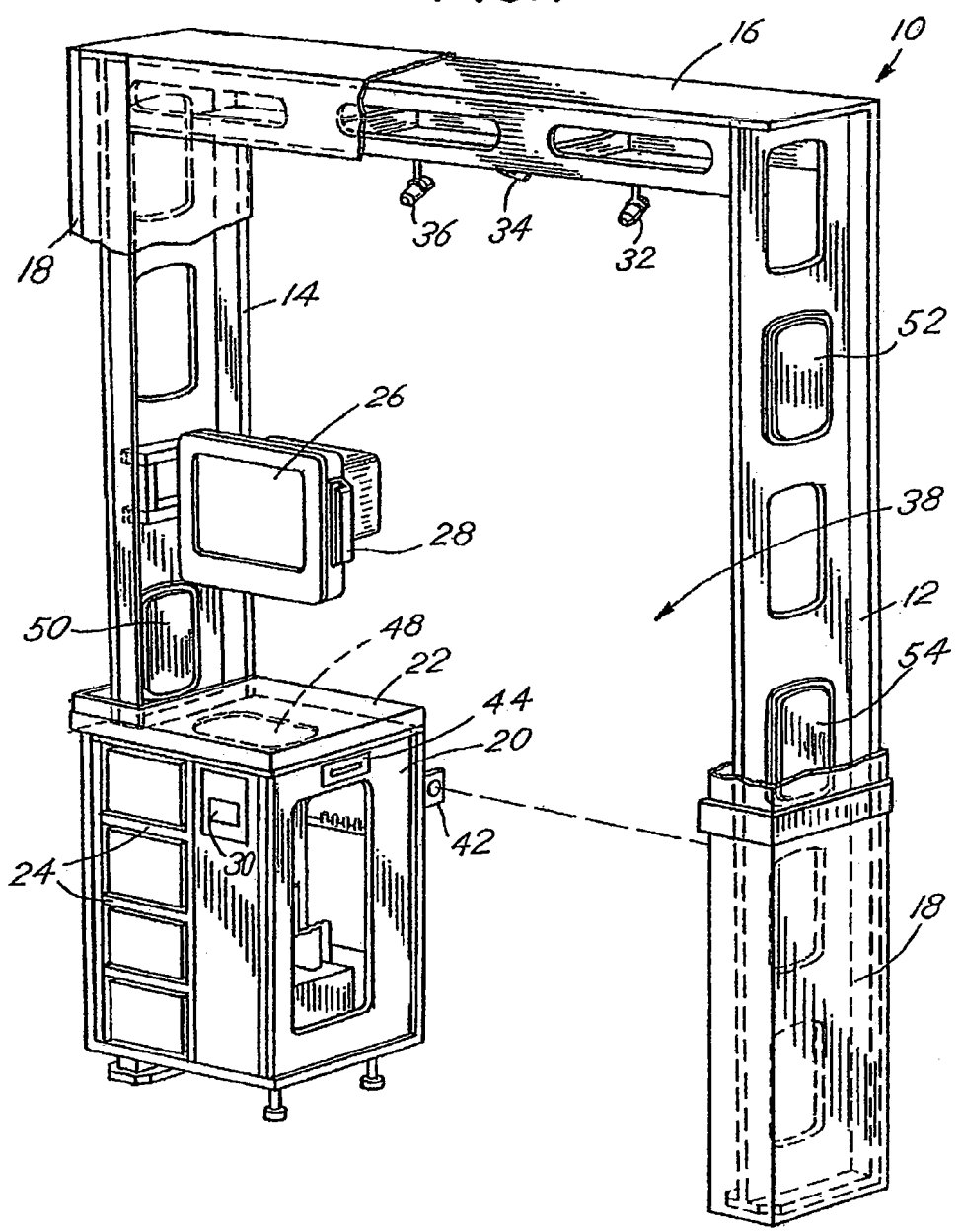
FIG. 1 is a view in perspective of a self-checkout kiosk made pursuant to the teachings of the present invention.

Referring now to FIGS. 1 and 2, a kiosk made according to the present invention illustrated generally by the numeral 10. The kiosk 10 is intended for use in institutions where availability of product on a twenty-four hour, seven day a week basis is desired. Typical applications include hotels, college dormitories, etc. As shown in FIG. 2, the kiosk 10 includes a portal defining the entrance into, or egress from, a vending area generally indicated by the numeral 11. As illustrated, multiple products, each tagged with a Radio Frequency Identification (RFID) tag, are displayed for purchase in the vending area 11. As illustrated, such products may include soft drinks, snacks, sandwiches, video tapes, and other products. According to the invention, a patron enters the vending area 11 through the portal, selects from one or more of the products displayed, and then exits through the portal after completing a self checkout transaction at a self-checkout station as will be hereinafter explained. As will also be explained, various security measures inhibit a patron from removing products from the vending area without completing a self checkout transaction, which includes payment for the items.

The portal is defined by a pair of facing, substantially parallel side frame members 12 and 14, which are connected by an upper transverse frame member 16. The frame members 12, 14 and 16 are made of any suitable material, such as wood or particle board, and are covered by a decorative covering 18 made of any material which allows passage of radio frequency waves, particularly waves at a frequency of 915 MHZ. Typical materials of the covering 18 include plastic and plywood with a laminate finish. Although only one portal is illustrated, multiple portals may be used to provide entry into and egress from the vending area. The side frame member 14 terminates at a counter 20, which includes an upper surface or tray 22 upon which product being purchased may be placed, as will hereinafter be explained.

Figure 8:
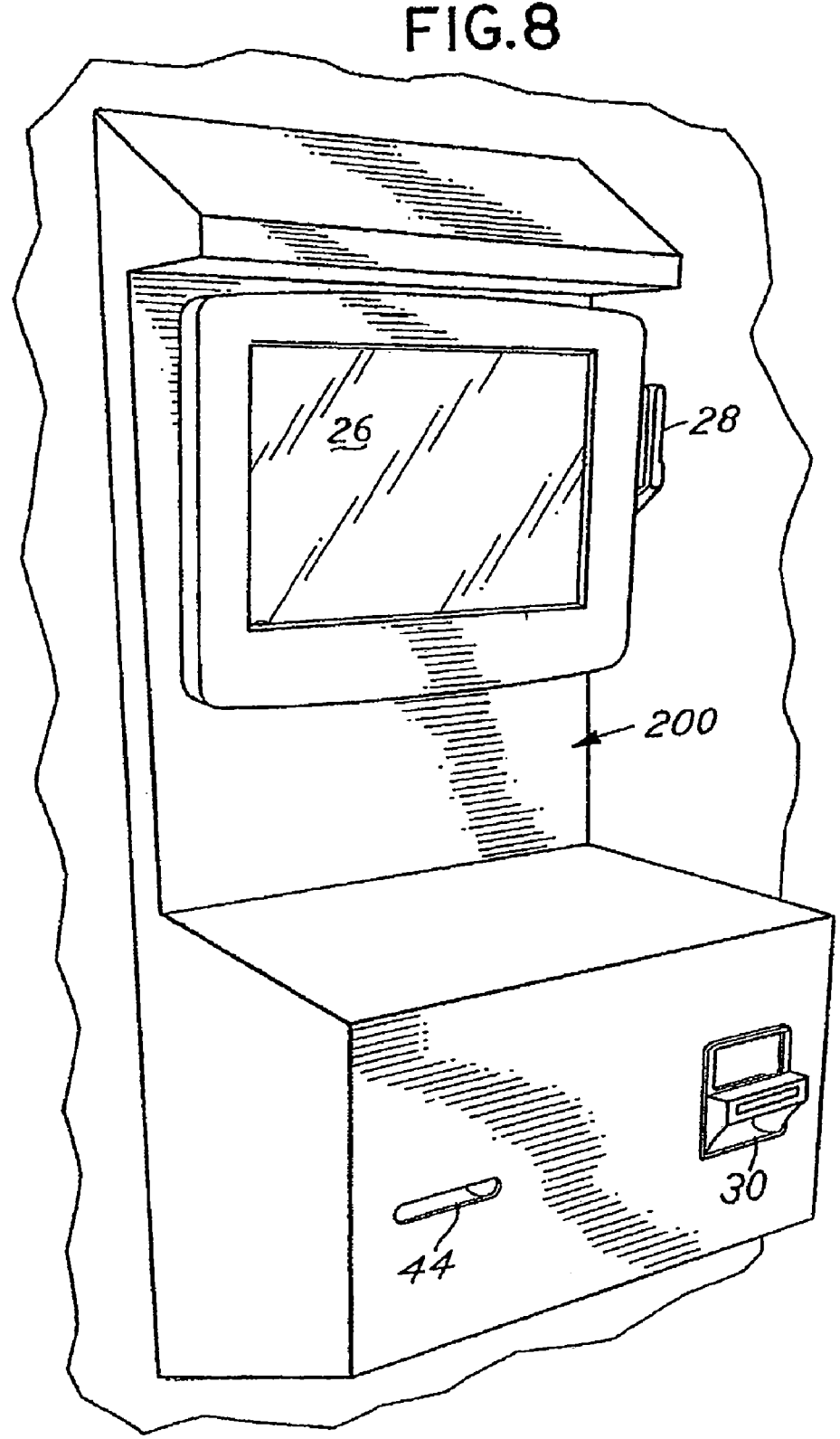
FIG. 8 is a view in perspective of a self-checkout station used in an alternate embodiment of the kiosk illustrated in FIG. 1.

The counter 20 provides a locked area for placement of a RFID reader, a DVD recorder, a computer, and a router, all of which will be hereinafter explicitly identified and explained. A touch screen computer monitor 26 is mounted on the side frame member 14 and projects above the tray 22 where it is easily accessible to a patron completing a checkout transaction. A conventional card reading swipe 28 is mounted on the edge of the monitor 26, which is used to read credit cards and other cards which may be used to process a purchase transaction. A conventional receipt printer 44 is mounted adjacent the tray and/or monitor for printing a receipt confirming a purchase transaction. A conventional bill acceptor 30 available commercially as a ValTech bill acceptor, is mounted on the counter 20 to accept currency to be used in payment for product. A conventional microphone and speaker enable a patron to communicate with an attendant at a remote location. While the kiosk of the invention does not require the presence of an attendant on site, it permits communication with an attendant at a remote location, who is able to supervise several self checkout kiosks. Together, the counter 20, touch screen computer monitor 26, card reading swipe 28, receipt printer 44 and bill acceptor 30 define a self-checkout station that permits a customer to complete a purchase transaction. Although the self-checkout station is illustrated in the embodiment of FIG. 1 as being integral with the portal, it will be understood that the self-checkout station may be separated from the portal, and may be located anywhere within the vending area. For example, and referring to FIG. 8, a self-checkout station generally indicated at 200 is illustrated as being mounted on a wall within the vending area 11 and is separate from the portal (not shown). Although the self-checkout station 200 is shown as being mounted on the wall, it could be mounted on a counter, pedestal or similar support within the vending area 11. The self-checkout station 11 includes the monitor 26, card reading swipe 28, bill acceptor 30, and receipt printer 44, also used in the self-checkout station illustrated in FIG. 1 as being integral with the portal.

Conventional security cameras 32, 34 and 36 are mounted on the uprights 12, 14 and 16. Security camera 34 is focused on the patron standing near the monitor 26, and cameras 32 and 36 are trained on the vending area 11 and or the areas adjacent the kiosk 10. The uprights 12, 14 and 16 and the counter 20 cooperate to define a portal 38 through which a patron must leave the vending area 11. The cameras 32, 24, and 26 are aimed to photograph anyone in the vending area 11, and any patron leaving through the portal 38. Each of the cameras are connected to a conventional DVD recorder 40 which may be located within the cabinet 20. A fourth camera (not shown) may be aimed at the monitor. The cameras and DVD recorder are components of a security system available commercially from Everfocus as Everfocus DVSR-400. A conventional motion sensor, such as photoelectric motion sensor 42, which projects a photoelectric beam across the portal 38 and which generates a signal communicated to the computer when the beam is broken, is mounted on the kiosk 10 and projects the beam across the portal 38 to detect movement of a patron through the portal 38. Electronic signage (not shown) is mounted on the frame member 16 on the edge thereof facing away from the vending area 11. A receipt printer 44, such as is available from Swecoin, is also mounted adjacent the counter 22. The receipt printer, bill acceptor, card swipe, the DVD component of the security system, and the RFID reader discussed below are all connected to the computer.

Figure 6:
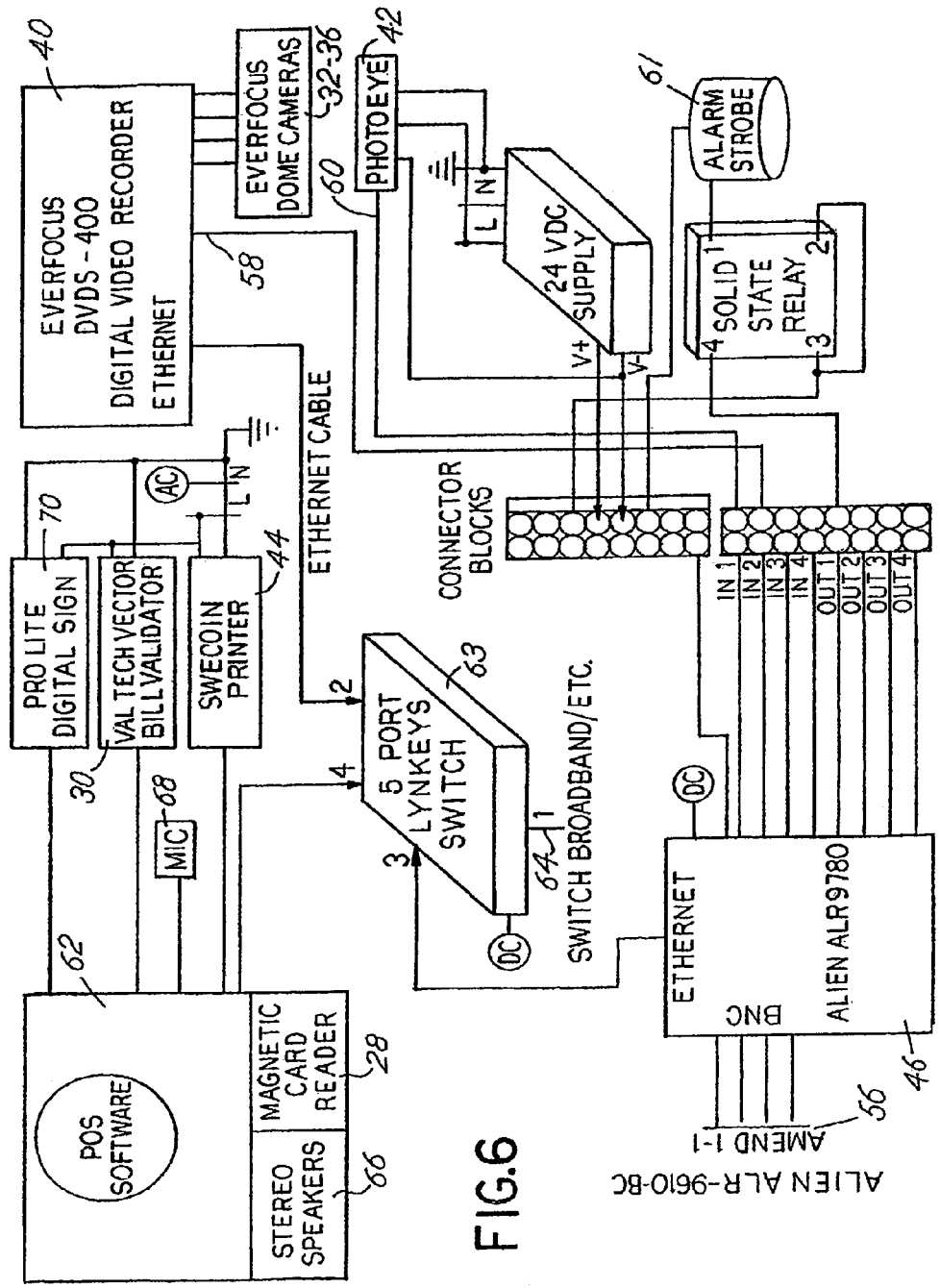
FIG. 6 is a block diagram illustrating the components of the present invention and their interconnections.

As discussed above, all products available in the vending area 11 bears RFID tags. The tags may be a 96 bit Lepton chip read many, write once class 1 type tag. The tags are read by a reader, which is well known in the art, such as an Alien Technology Model ALR 9780 indicated at 46 (FIG. 6), and operating at 915 MHZ. The RFID reader is stored within the cabinet 20, and is connected via appropriate cables to four circular polarized 915 MHZ antennas 48,50,52 and 54. Antenna 48 is mounted in counter 20 immediately below the tray 22 with its polarization facing upwards toward the tray. Although only a single RFID reader is illustrated, it will be understood that multiple RFID readers may be desirable or necessary if the self-checkout station is separate from the portal and located at a distance there from that it is desirable that a separate RFID reader be used to be used only for the RFID antenna at the self-checkout station and a separate RFID reader be used for the antennas providing security at the portal. Of course, if multiple portals are used, it may be desirable to use RFID readers to accommodate each portal.

The RFID readers each would be connected to the computer. The antenna 50 is mounted in side frame member 14 perpendicular to the antenna 48 and with its polarization facing into the portal 38. Antennas 48 and 50 provide the strongest tag detection when the vended product is placed on the tray. Antennas 52 and 54 are mounted in the side frame member 12, with approximately even spacing between the antennas 52 and 54, between the antenna 52 and the transverse frame member 16, and between the antenna 54 and the floor. Both antennas 52 and 54 have their polarizations facing into the portal 38. Each of the antennas 48-54 are identical, and each are substantially flat panels with rounded ends and straight sides between the rounded ends. The circular polarizing results in a curtain of radio frequency waves radiating at a 45 degree angle from the circular ends. Accordingly, as illustrated in FIG. 3 the radio frequency curtains radiated by each of the antennas 48-54 overlap to form a curtain across the entire portal 38, so that any attempt to move product through the portal will result in the RFID tag on the product being read.

Figure 7:
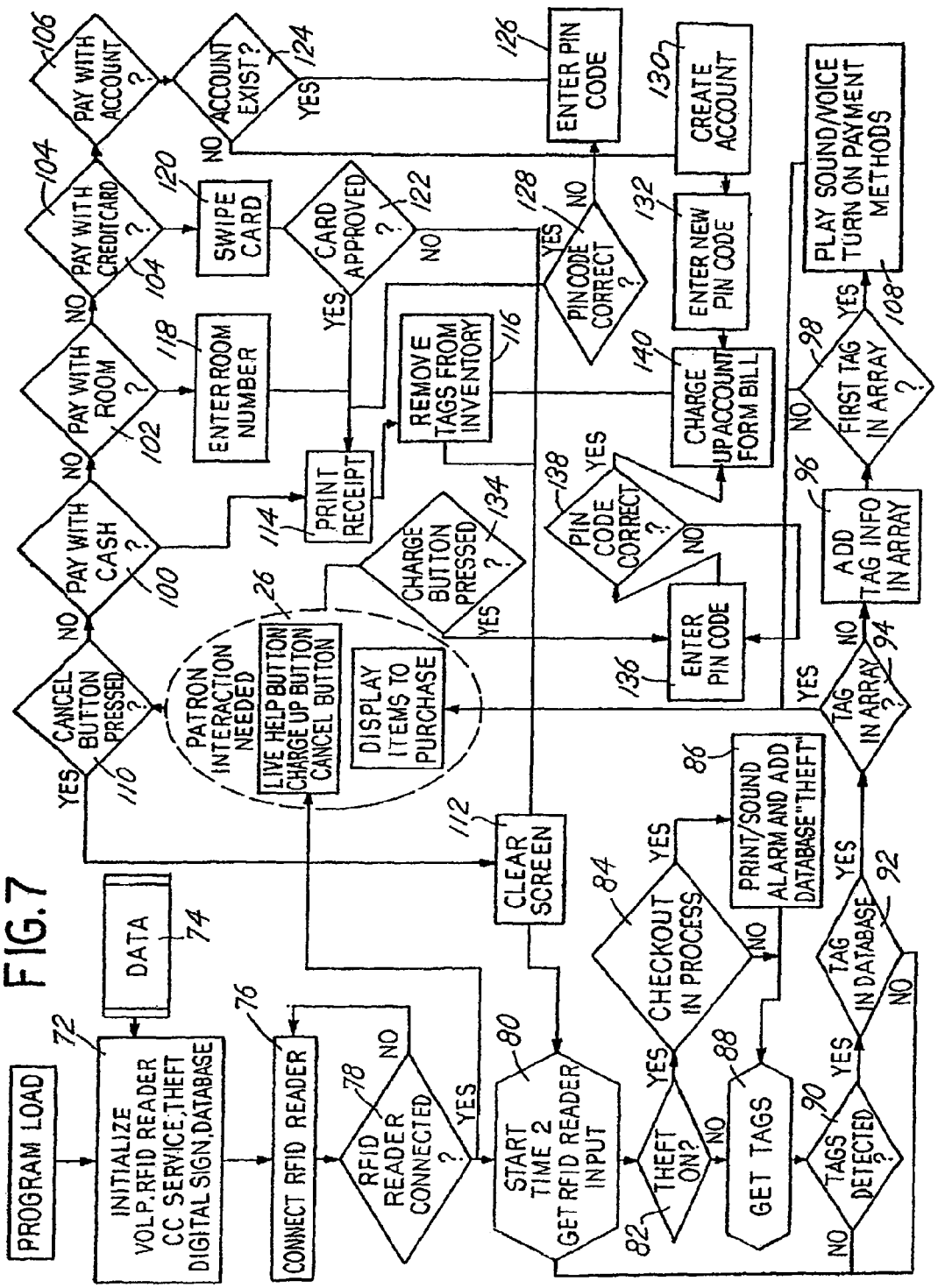
FIG. 7 is a diagrammatic flow chart of the Point of Sale (POS) software used in the present invention.

Referring now to FIG. 7, the RFID reader 46 includes multiple input ports 56, each of which is respectively connected to a corresponding one of the antennas 48-54, and has additional inputs connected to the output 58 of the DVD recorder 40, and to the sensing output 60 of the photo eye 42. Reader 46 also has outputs connected, through the appropriate relays, to an alarm or strobe light 61. An ethernet port connects the reader 46 to a Linksys router, the other ports of which are connected to ethernet ports on the DVD recorder 40 and on the personal computer. The router 63 includes a port which is connected via a broadband connection to a remote computer.

Through a voice-over-internet protocol, the remote attendant may talk to a patron using the kiosk 10, but the attendant at a main kiosk can also handle several other remote, non-attended kiosks. It is also contemplated that a local inventory will be maintained on the computer 62, but through the router 63 and the broadband connection the local inventory will be updated by a master inventory at a remote location or main kiosk for inventory maintenance. The local inventory can also be updated by the remote computer to update for new inventory, restocking, etc. The computer 62 is also connected to speakers 66 and microphone 68, to provide the aforementioned communication between the patron using the kiosk 10 and the remote attendant, and further includes a driver for the digital sign and has ports connected to the receipt printer 44 and the bill/coin validator/acceptor 30.

Referring to FIG. 7, a flow chart of the software is disclosed, which is a compilation of the software included within the computer 62 and tag reader 46. Upon the kiosk 10 being available to patrons, the remote computer signals computer 62 to initialize the systems components, as indicated at 72. At that time, the computer 62 reads inventory data from the main terminal as indicated at 74. The RFID reader or readers are then activated, as indicated at 76, a test is made at 78 to assure that the RFID reader or readers have been connected, upon which the help button, charge up button, and cancel button on the monitor are activated and the items to purchase display is also activated. At that time a timer is started and a tag is read, as at 80. A test is made at 82 and 84, to determine if the beam generated by the photoelectric eye has been broken while one or more tags have been sensed, that have not been marked in the database as being sold, at which time an alarm is sounded and the inventory database is marked for the theft, as indicted at 86. The DVD recorder is also signaled into an enhanced recording mode, so that the images from the cameras are recorded at 60 frames per second, instead of the normal five frames per second.

If a theft has not been flagged at 82, and a tag is detected at 88 and 90, a test is made to determine if the tag is in the database as at 92 so that pricing can be established and the item and price is added to the array (if not already displayed) on the monitor 26, as indicated at 94 and 96. If the tag is the first tag in the array, as determined at 98, payment option buttons 100, 102, 104, and 106 are turned on and displayed on the monitor, as indicated at 108, along with a voice prompt requesting the patron to select a payment method. The cancel button 110 is always displayed, which permits the patron to cancel the transaction at any time, upon which the screen is cleared as indicated at 112. If the patron elects to pay with cash by selecting that option at 100, a receipt is printed as indicated at 114, the item is removed from the inventory record as indicated at 116 and marked as "sold", and the screen cleared as indicated at 112, after, of course deposit of a sufficient amount of currency in the bill acceptor is confirmed. If the patron elects to pay by charging the purchase to a hotel room by choosing 102, the patron is asked to enter the room number on the keypad as indicated at 118, after which the transaction is completed by printing a receipt, removing the items purchased from the inventory record as being sold, and clearing the screen as discussed above. If the patron elects to pay by credit card by selecting that option at 104, the patron is requested to swipe the card as at 120 and the normal card verification procedures over the broadband connection through the router 50 are completed, as indicated at 122. Upon card approval, the transaction is completed by printing the receipt, removing the item from inventory, and clearing the screen. If the card is not approved, the patron is so informed on the monitor screen, and the transaction is aborted and the screen cleared.

The patron may also elect to pay by using a charge-up card by choosing that option at 106. Charge-up cards are particularly useful in situations such as collage dormitories, where repeated purchases are expected. This option allows the patron to "charge up" a card at one visit and use credits remaining on the card for subsequent visits. If option 106 is selected, a test is made at 124 to determine if a current account with sufficient credits exists for the card being used. If so, the patron is requested to enter the corresponding PIN number as indicated at 126, which is confirmed at 128. If the PIN number is correct, the transaction is completed by printing a receipt, removing the item from inventory as being sold, and clearing the screen; if the PIN number is incorrect, the patron is requested to re-enter the PIN number. If an account does not exist, the patron is asked to enter the information necessary to establish the account on the keyboard as indicated at 130, and the patron is asked to enter a new desired PIN number on the keyboard at 132, upon which the account must be charged up. A new account may be charged up, or the credits on an existing account increased, by pushing the "charge up" button on the monitor screen, as indicated at 134. The patron will then be prompted to deposit currency to charge up the account and to enter the PIN number at 136 (the PIN number may be the same as the PIN number just entered at 132 if a new account is being established), the account is charged up and a bill/receipt formed as indicated at 140, at which time the transaction is completed by clearing the screen.

Although the kiosk 10 has been described as including both a self-checkout station and a portal incorporating security measures, the portal itself may be used in conventional retail environments to control inventory shrinkage. For example, in traditional retailers having attended checkout lanes, one or more of the security portals as described herein may be installed where customers, after proceeding through the checkout lanes (whether attended or unattended) must pass through one of the portals before exiting the retailer. When the customer proceeds through checkout, each of the products purchased are removed from the inventory database maintained by the store and marked "sold". When the RFID reader associated with the antennas mounted on the portal sense transfer of product through the portal that has not been marked sold, appropriate security alarms are initiated.

Figure 4:
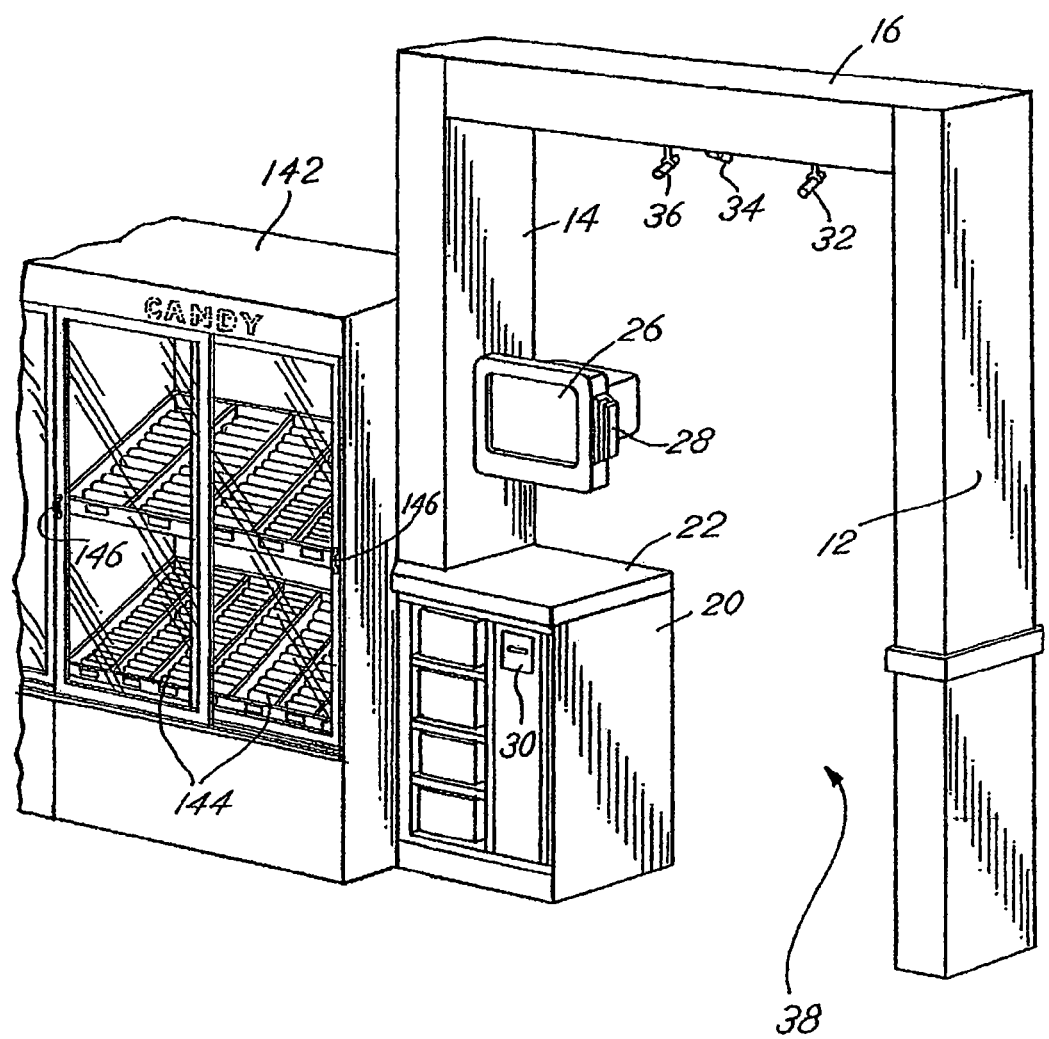
FIG. 4 is a view similar to FIG. 1 but illustrating another embodiment of the invention.
Figure 5:
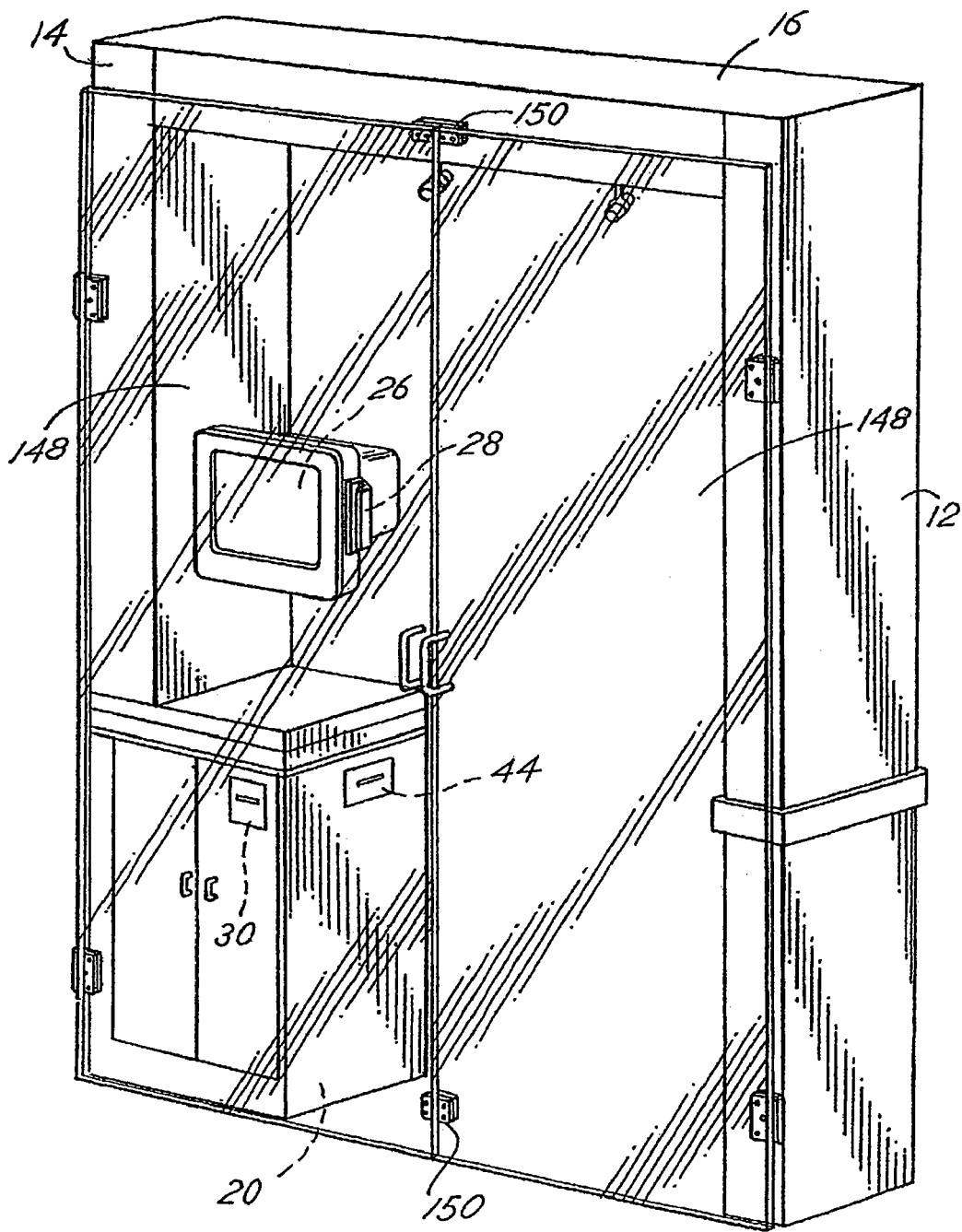
FIG. 5 is a view similar to FIGS. 1 and 4, but illustrating still another embodiment of the present invention.

The kiosk described above provides a minimum level of security. If an enhanced level of security is desired, the various display cases within the vending area 11, such as the candy display case 142 in FIG. 4, is enclosed and provided with sliding doors 144 equipped with magnetically released locks as at 146. Before product is made available, the patron must swipe a credit card (or charge-up card) to unlock the doors of the display cases. Accordingly, an indication of the patron's identity can be retained. If a still greater level of security is desired, doors, such as the transparent doors 148 in FIG. 5, are mounted on the side frame members 12 and 14 via hinges. The doors close the portal 38, and are mounted on the edges of the side frame members that face into the vending area 11. The doors are latched with magnetically released locks 150. Since the doors extend across the inside of the kiosk 10, the monitor 26 and card swipe 28 are outside of the doors and are available to a patron. In order to unlock the doors and enter into the vending area, the patron must swipe a credit card (or a charge-up card) in the card swipe 28. Accordingly, before the patron even enters the vending area, an indication of the patron's identity is retained.

What is claimed is:

1. An unattended checkout and security system comprising: a product;
a radio frequency identification (RFID) tag attached to the product; a frame defining a portal there between wherein transfer of the product from a vending area to a non-vending area requires the product to pass through the portal; a first RFID antenna coupled to the frame to detect the RFID tag passing through the portal; a RFID reader configured to read product data from the RFID tag; a self-checkout apparatus located within the vending area, the self-checkout apparatus including a purchasing mechanism configured to accept payment for the product after the RFID reader reads the product data from the RFID tag; a database coupled to the purchasing mechanism and configured to store an inventory of items located within the vending area, one of the items including the product, wherein each of the items has a different identification code and corresponds to a unique database record within the database, the database further configured to receive the product data from the RFID reader and update the database record for the corresponding product by marking the database record for the corresponding product as sold after payment for the product is accepted by the purchasing mechanism, the database further configured to update the database record for the corresponding product by marking the database record for the corresponding product as stolen when the product moves through the portal and the database record for the corresponding product has not been marked as sold; a video camera directed toward the portal and configured to send video data to a remote location outside the vending area; a video recorder for storing the video data and configured to respond to transfer of the product through the portal when the database record indicates a lack of accepted payment for the product; a motion sensing device for sensing movement of a patron through the portal; and a theft warning device configured to respond when the motion sensing device detects the patron move through the portal with the product and the database record indicates a lack of accepted payment for the product.

2. The unattended checkout and security system of claim 1, wherein the self-checkout apparatus further includes: a monitor; and a processor coupled to the monitor for assisting a patron in completing a purchase transaction.

3. The unattended checkout and security system of claim 2, further comprising a second RFID antenna coupled to the frame.

4. The unattended checkout and security system of claim 1, wherein the self-checkout apparatus is positioned adjacent to the frame.

5. The unattended checkout and security system of claim 1, further comprising a second RFID antenna coupled to the frame and wherein the first and second RFID antennas are directed to project radio frequency waves across the portal in multiple directions.

6. The unattended checkout and security system of claim 5, further comprising: a counter coupled to the frame and defining an upper surface; and a second RFID antenna mounted below the upper surface and configured to project radio frequency waves through the upper surface to read the RFID tag on the product when the product is moved across the upper surface.

7. The unattended checkout and security system of claim 5, wherein the frame includes a first side frame member and a second side frame member extending parallel to one another, the first side frame member terminating at the counter and including the first RFID antenna directed towards the second side frame member, the second side frame member including a third RFID antenna and a fourth RFID antenna directed towards the first side frame member, and wherein the first, third and fourth RFID antennas are configured to project overlapping radio frequency waves across the portal.

8. The unattended checkout and security system of claim 7, wherein the first and second RFID antennas are offset from each other and are configured to project overlapping radio waves across the portal.

* * * * *